US009016763B2

(12) United States Patent
Cimatti

(10) Patent No.: US 9,016,763 B2
(45) Date of Patent: Apr. 28, 2015

(54) CAR WITH AN UNDERBODY PROVIDED WITH AN AERODYNAMIC DIFFUSER

(71) Applicant: Franco Cimatti, Pavullo (IT)

(72) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/929,175

(22) Filed: Jun. 27, 2013

(65) Prior Publication Data

US 2014/0001789 A1 Jan. 2, 2014

(30) Foreign Application Priority Data

Jun. 28, 2012 (IT) ................................ BO2012A0358

(51) Int. Cl.
*B62D 35/02* (2006.01)
*B62D 37/02* (2006.01)
(52) U.S. Cl.
CPC ................ *B62D 35/02* (2013.01); *B62D 37/02* (2013.01); *Y10S 180/903* (2013.01)
(58) Field of Classification Search
CPC .... B62D 35/00; B62D 35/007; B62D 35/008; B62D 35/02; B62D 37/02; B62D 25/2036
USPC .......... 296/146.1, 146.5, 146.9, 180.1, 181.1, 296/181.5, 209; 180/69.1, 903
See application file for complete search history.

(56) References Cited

U.S. PATENT DOCUMENTS 2,114,344 A * 4/1938 Haberstump ................. 296/209
4,029,353 A * 6/1977 Barenyi et al. ............... 296/207
4,455,045 A * 6/1984 Wheeler ..................... 296/181.5
4,616,869 A * 10/1986 Sacco et al. ................ 296/180.1
4,772,060 A   9/1988 Kretschmer
4,966,408 A * 10/1990 Yura .......................... 296/181.5

(Continued)

FOREIGN PATENT DOCUMENTS

DE     4102073 A1   7/1992
DE     4209164 A1   9/1993
DE    29703392 U1   4/1997

(Continued)

OTHER PUBLICATIONS

"Italian Application Serial No. IT B020120358, Search Report dated Mar. 8, 2013", 7 pgs.

(Continued)

*Primary Examiner* — Glenn Dayoan
*Assistant Examiner* — Jason S Daniels
(74) *Attorney, Agent, or Firm* — Schwegman Lundberg & Woessner, P.A.

(57) ABSTRACT

A car having a frame, which supports a pair of front wheels and a pair of rear wheels, a passenger compartment, at least one pair of doors, and an underbody which delimits the car on the lower side, faces the road surface, and has an aerodynamic diffuser, which is arranged in a rear position and is provided with a chute having a height with respect to the road surface that progressively increases when longitudinally moving from the front to the rear. The underbody can include a pair of aerodynamic channels, each of which extends longitudinally, leads to the aerodynamic diffuser, is open on the lower side towards the road surface, has a shape of an upside-down "U" in its transverse section and is open underneath towards the road surface and has, in its transverse section, an area that progressively increases when longitudinally moving from the front to the rear.

15 Claims, 7 Drawing Sheets

(56) References Cited

U.S. PATENT DOCUMENTS

| | | | |
|---|---|---|---|
| 5,322,340 A * | 6/1994 | Sato et al. | 296/180.1 |
| 2009/0025993 A1 | 1/2009 | Hines | |

FOREIGN PATENT DOCUMENTS

| | | |
|---|---|---|
| EP | 0247306 A1 | 12/1987 |
| EP | 1216914 A2 | 6/2002 |
| GB | 2269142 A | 2/1994 |
| JP | 61-188279 A | 8/1986 |
| WO | WO-2013/049900 A1 | 4/2013 |

OTHER PUBLICATIONS

"European Application Serial No. 13174436.9, European Search Report mailed Oct. 16, 2013", 6 pgs.

"European Application Serial No. 13174436.9, Office Action mailed Dec. 13, 2013", 4 pgs.

"European Application Serial No. 13174436.9, Reply filed Jan. 23, 2014 to Office Action mailed Dec. 13, 2013", 4 pgs.

"European Application Serial No. 13174436.9, Reply filed Nov. 11, 2013 to European Search Report mailed Oct. 16, 2013", 3 pgs.

\* cited by examiner

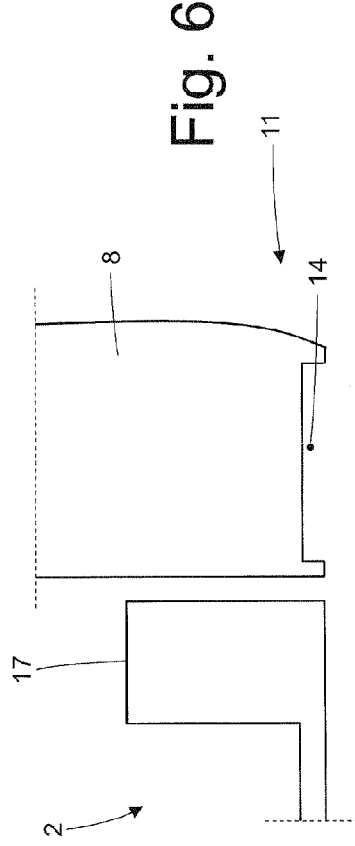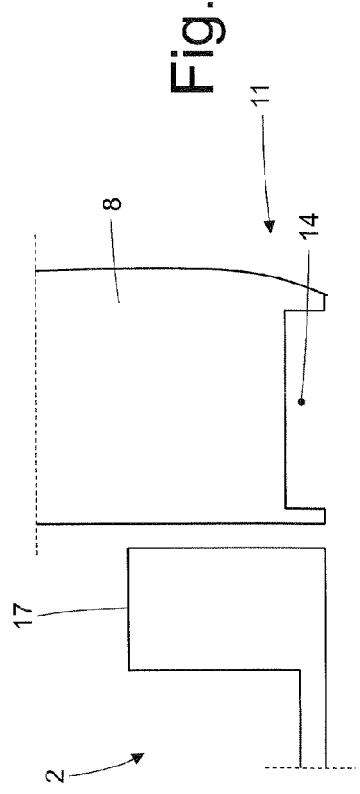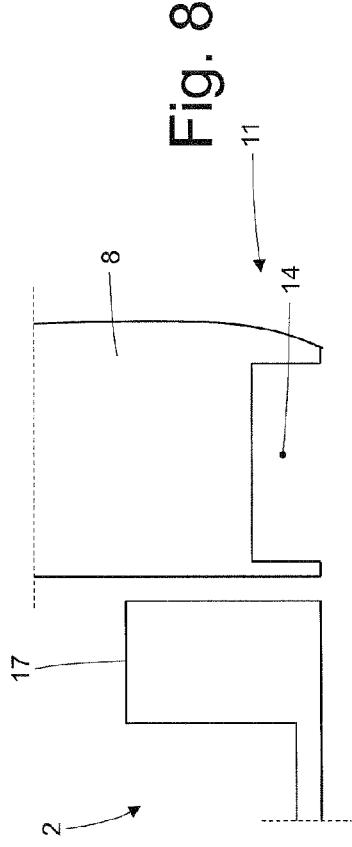

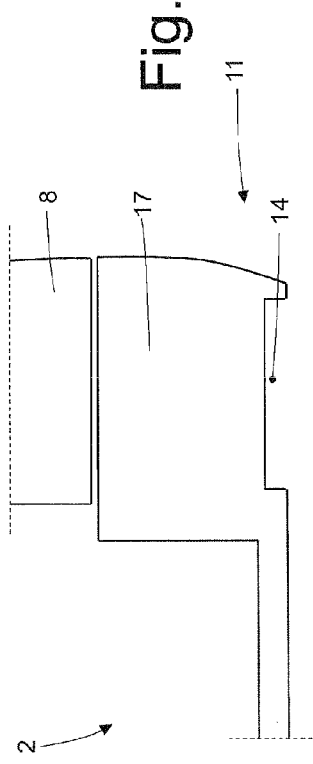
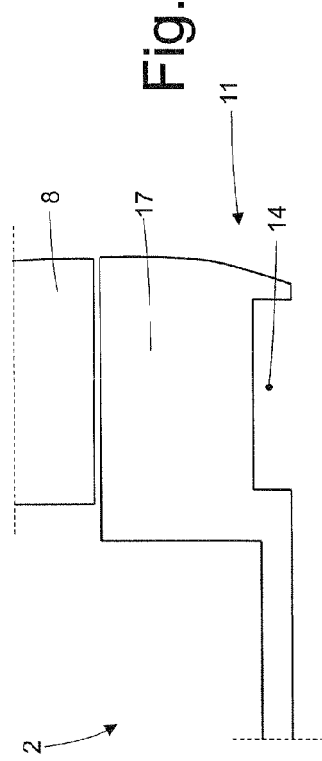
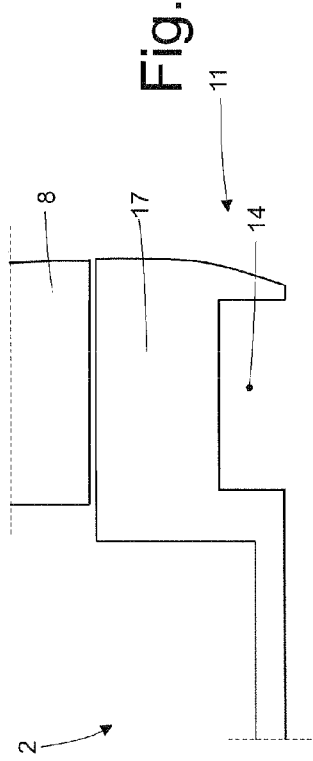

US 9,016,763 B2

CAR WITH AN UNDERBODY PROVIDED WITH AN AERODYNAMIC DIFFUSER

PRIORITY CLAIM AND RELATED APPLICATIONS

This application claims the benefit of priority under 35 U.S.C. Section 119 to Italian Patent Application Serial No. BO2012A 000358, filed Jun. 28, 2012, which application is incorporated herein by reference in its entirety

TECHNICAL FIELD

The present invention relates to a car with an underbody provided with an aerodynamic diffuser.

BACKGROUND

Focus on the aerodynamic features of the underbody has gradually increased over the past years also for registered cars (i.e. cars which can circulate freely on roads open to the public). Initially, the trend was to make cars simply with fully flat underbodies with the sole objective of reducing aerodynamic drag. Later on, underbodies were shaped to reduce aerodynamic drag and also to increase downforce, i.e. so that the action of air (at high speeds) can generate a downward thrust on the car which increases road hold.

In order to increase downforce, it has been suggested to use an aerodynamic diffuser (or aerodynamic extractor) arranged in rear position, and comprising a chute, which constitutes the underbody of the car, faces the road surface, and has a height from the road surface which progressively increases when longitudinally moving from the front to the rear. At high speed, the air flowing underneath the car (i.e. between the underbody of the car and the road surface) crosses the aerodynamic diffuser and progressively increases its volume (as mentioned above, the aerodynamic diffuser has a height from the road surface which progressively increases when longitudinally moving from the front to the rear) and thus tends to gradually reduce its pressure, generating a vacuum under the vehicle as a consequence; such a vacuum creates downforce, i.e. an aerodynamic thrust which pushes the car downwards.

However, the aerodynamic development of the underbody of a car is subject to numerous geometry constraints deriving from the presence of dimensions which cannot be eliminated, such as the passenger compartment, the engine (particularly in the case of a mid or rear engine arrangement), the fuel tank, the exhaust system and the frame structure. These constraints considerably limit the extension of the shaped surfaces of the underbody intended to create downforce, and consequently in the known cars the underbody is completely flat to the rear part of the car (beyond the rear wheel axle) where the development of an aerodynamic diffuser starts. Consequently, in the known cars, the performance of the aerodynamic diffuser arranged on the underbody in rear position is adequate but not excellent (in particular if compared to the aerodynamic diffusers used on racing cars).

Patent application DE4102073A1 describes a car provided with an underbody which delimits the lower side of the car, faces the road surface and comprises an aerodynamic diffuser which is developed in rear position and has a chute, having a height from the road itself which progressively increases when longitudinally moving from the front to the back; the underbody also comprises a pair of aerodynamic channels, each of which extends longitudinally, leads to a radiator of a "V"-engine arranged in rear position, is open at the bottom towards the road surface, and has a transverse section with an area which progressively increases when longitudinally moving from the front to the rear.

OVERVIEW

Examples of the present subject matter provide a car with underbody provided with aerodynamic diffuser, which car is free from the drawbacks described above, is easy and cost-effective to make and in particular allows to obtain a high downforce without impairing aerodynamic resistance.

According to the present subject matter a car with an underbody provided with aerodynamic diffuser is provided as disclosed in the appended claims.

BRIEF DESCRIPTION OF THE DRAWINGS

The present invention will now be described with reference to the accompanying drawings, which illustrate some non-limitative embodiments thereof, in which:

FIGS. 6, 7 and 8 are three diagrammatic cross section views of a detail of FIG. 5 taken along section lines VI-VI, VII-VII and VIII-VIII;

FIGS. 10, 11 and 12 are three diagrammatic cross section views of a detail of FIG. 5 taken along section lines X-X, XI-XI and XII-XII.

DETAILED DESCRIPTION

Figure 1:
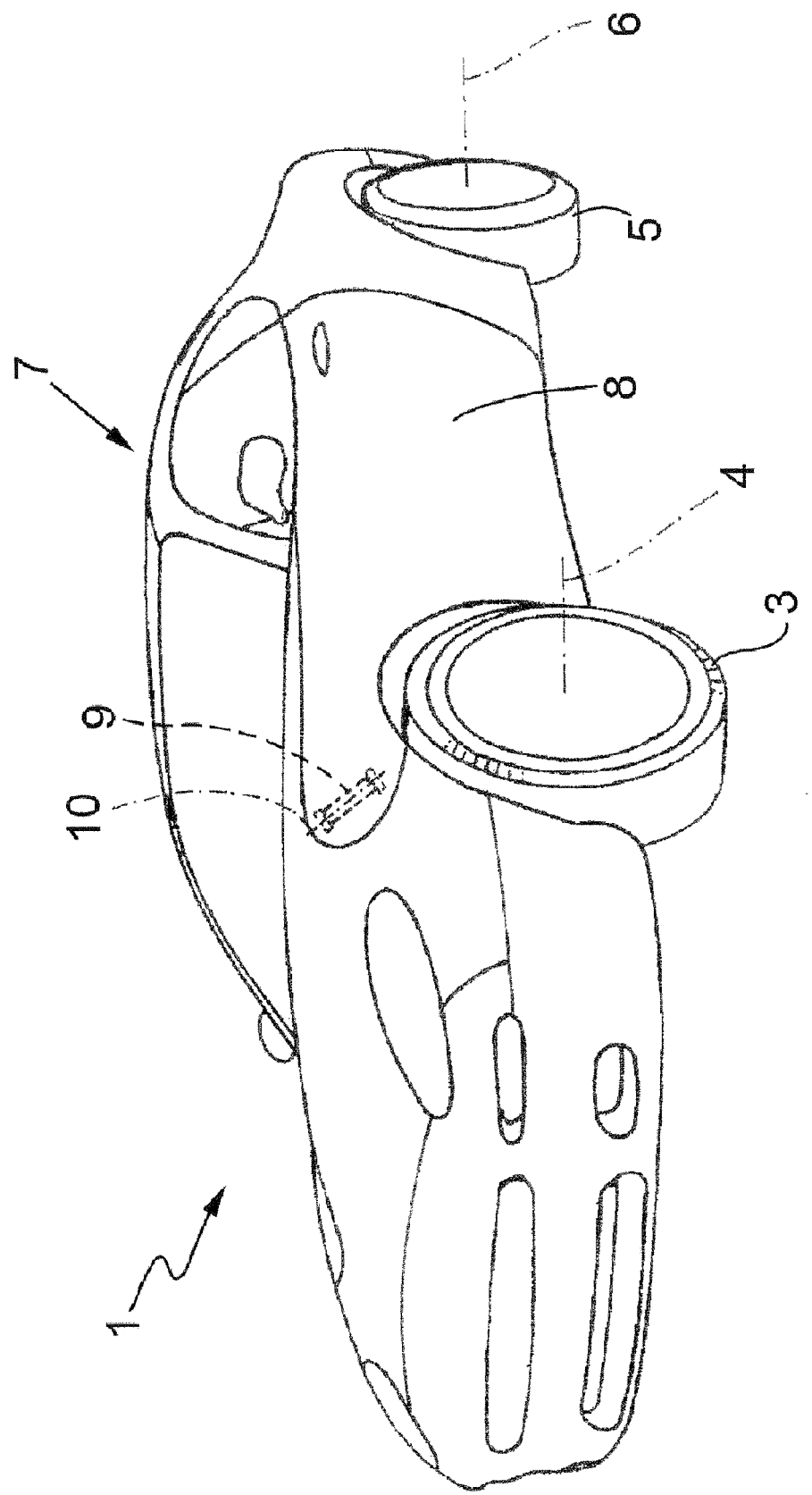
FIG. 1 is a perspective, diagrammatic view of a car made according to the present subject matter.
Figure 2:
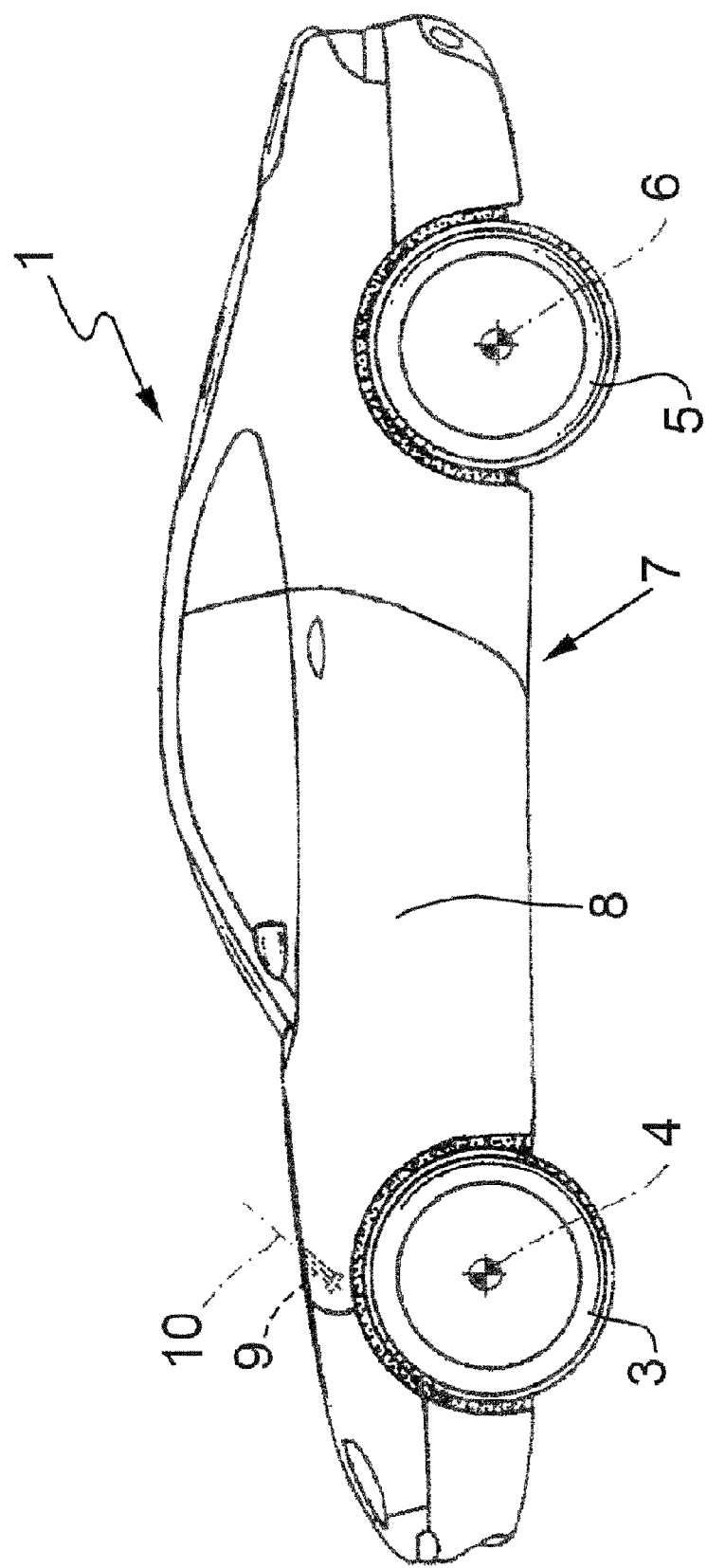
FIG. 2 is a side, diagrammatic view of the car in FIG. 1.

In FIG. 1, numeral 1 indicates as a whole a car comprising a frame 2 (shown in detail in FIG. 5), which supports a pair of front wheels 3, which turn about a horizontal rotation axis 4, and a pair of rear wheels 5, which turn about a horizontal rotation axis 6.

A passenger compartment 7 is obtained between the front wheels 3 and the rear wheels 5; a pair of doors 8 (in fact, the only doors of the car 1) are provided to allow access to the passenger compartment 7, each of which is hinged to the frame 2 by means of hinge 9 to turn about a rotation axis 10 between an opening position (not shown) and a closing position of the passenger compartment 7. The hinges 9 of the doors 8 are arranged in advanced position (approximately at the front wheels 3) and the rotation axis 10 of each hinge 9 forms an angle of approximately 30° with the horizontal and on a vertical plane arranged transversally with respect to the car 1, and forms an angle of approximately 50° with the horizontal and a vertical plane arranged longitudinally with respect to the car 1; in this manner, each hinge 9 confers an opening/closing movement which develops along a prevalently vertical plane to the corresponding door 8.

Each door 8 comprises the front portion of the wing of the corresponding front door 3 and the corresponding door sill (i.e. the portion of the vehicle normally arranged under the doors); thus, by effect of the fact that each door 8 comprises the corresponding door sill, no fixed component is present under the door 8 itself (i.e. no component is restrained to the door 8) when the door 8 is closed. In other words, the frame 2 stops flushed with the doors 8 and does not comprise any component arranged underneath the doors 8 themselves.

Figure 3:
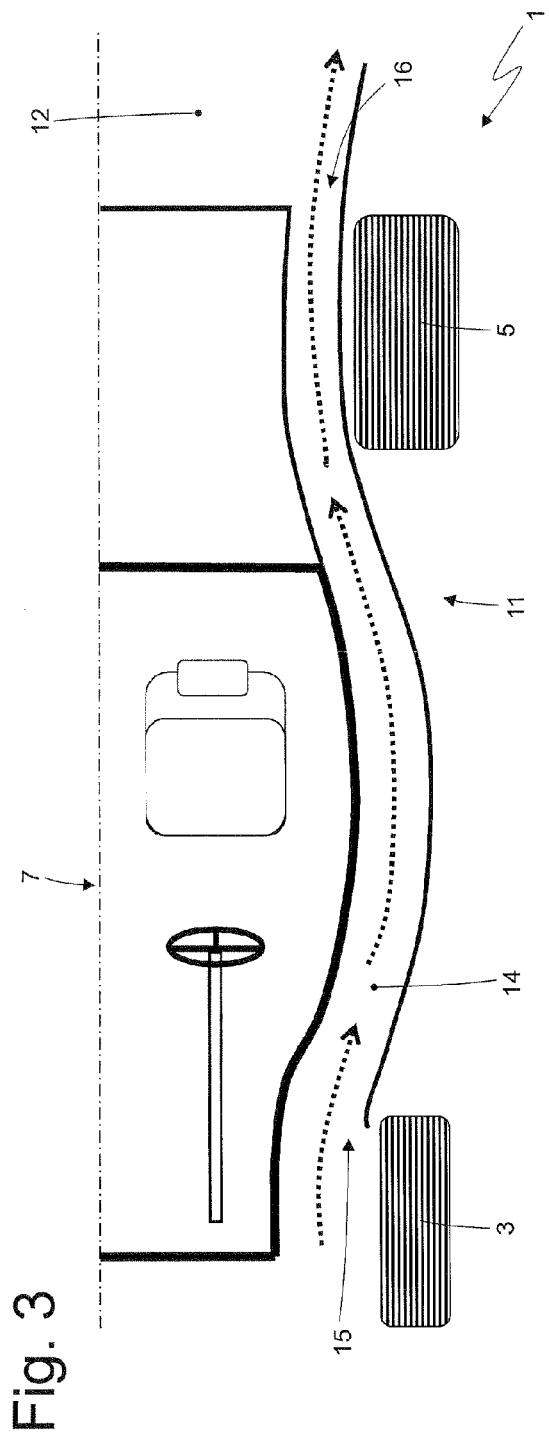
FIG. 3 is a diagrammatic plan view, with several parts removed for clarity of the car in FIG. 1.
Figure 4:
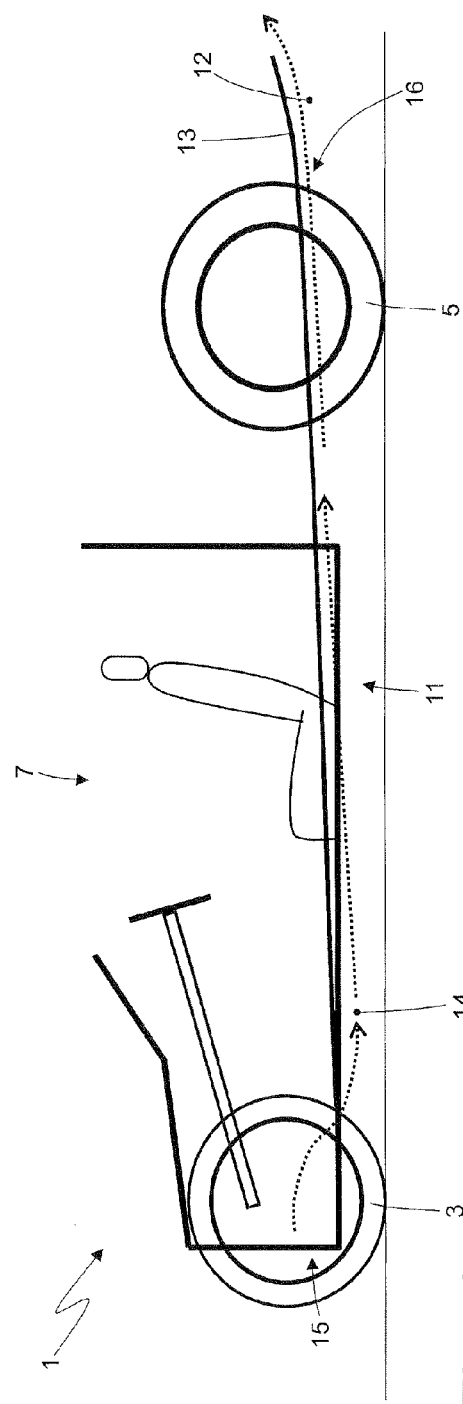
FIG. 4 is a side, diagrammatic view, with several parts removed for clarity, of the car in FIG. 1.
Figure 5:
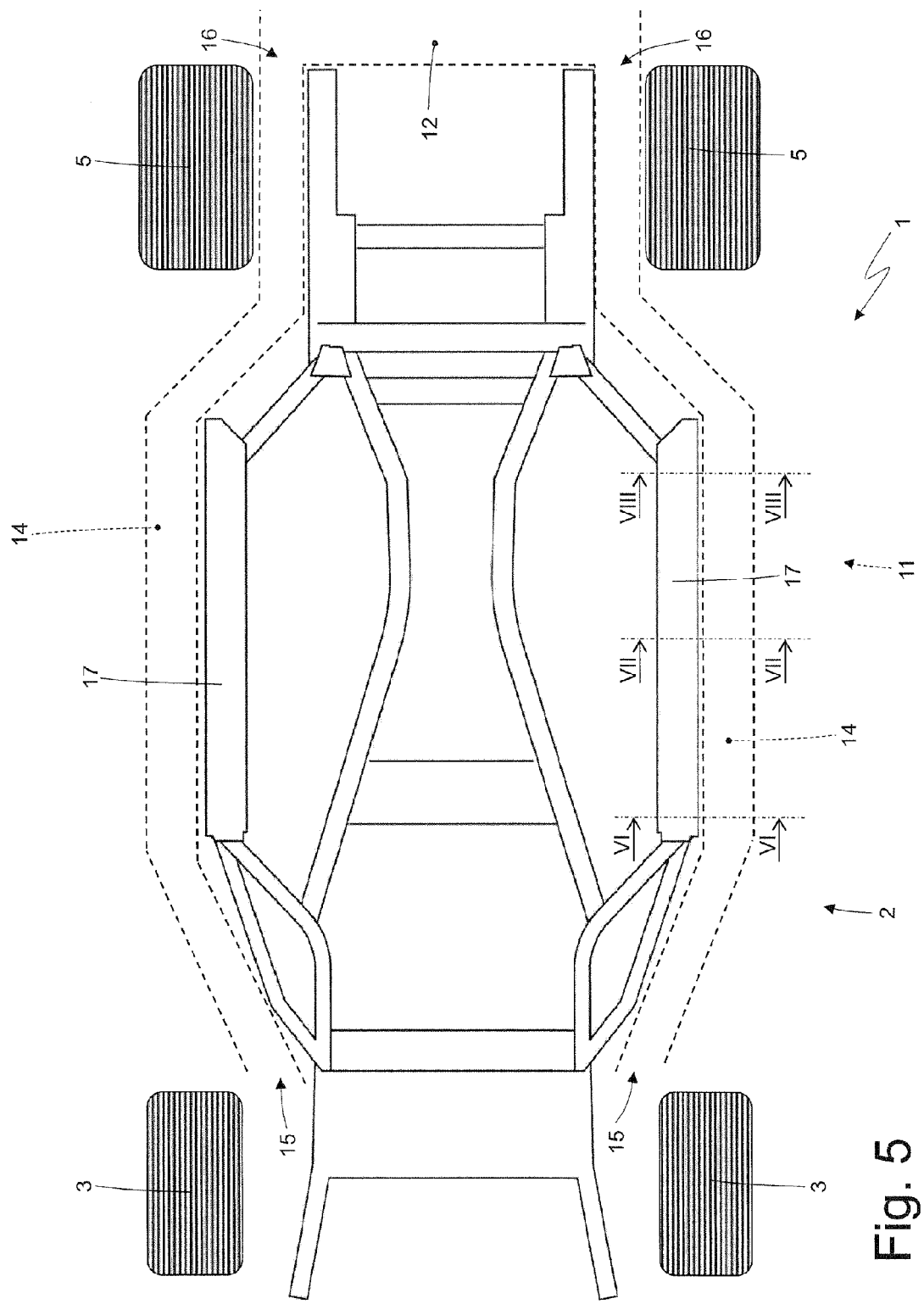
FIG. 5 is a plan, diagrammatic view of the frame of the car in FIG. 1.
Figure 9:
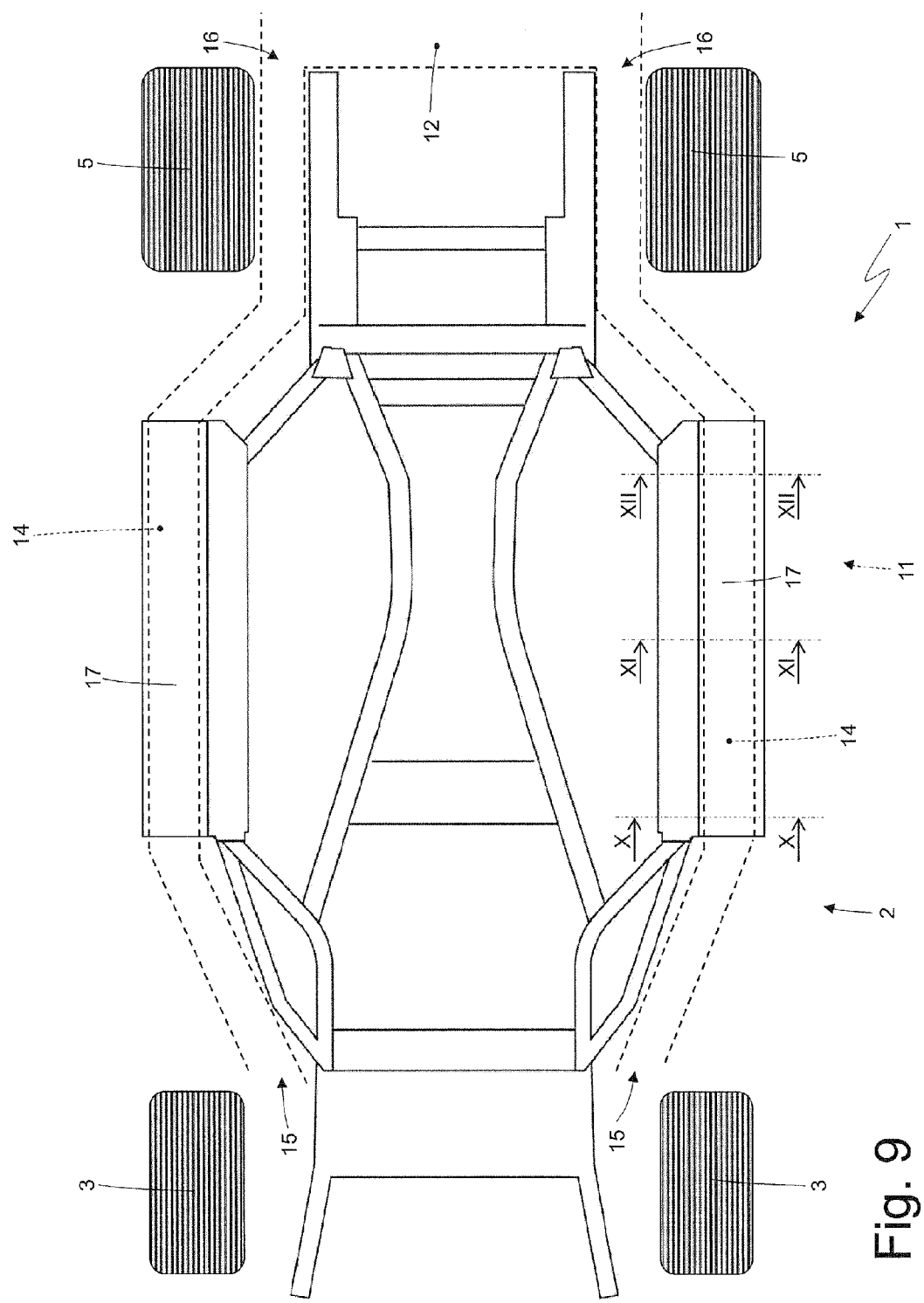
FIG. 9 is a plan, diagrammatic view of a different embodiment of the frame of the car in FIG. 1.

As shown in FIGS. 3-5, the car 1 comprises an underbody 11, which delimits the car 1 on the front (i.e. the lower part of the car 1) and faces the road surface. The underbody 11 comprises an aerodynamic diffuser 12 (or aerodynamic extractor) which is arranged in rear position and comprises a chute 13 having a height with respect to the road surface itself which progressively increases when longitudinally moving from the front to the rear. The aerodynamic diffuser 12 is as wide as possible (i.e. has the maximum possible transversal width) and normally extends for at least all the space comprised between the two rear wheels 5. Normally, the aerodynamic diffuser 12 starts near the rear axle, but could start a little before (i.e. more towards the front) or a little after (i.e. more towards the rear) compatibly with the geometric constraints imposed by other components of the car 1.

As shown in FIGS. 3-5, the underbody 11 comprises a pair of aerodynamic channels 14 which are arranged on opposite sides of the car 1 and lead into the aerodynamic diffuser 12. Each aerodynamic channel 14 extends longitudinally between an inlet end 15 (front) which is arranged at a front wheel 3 and an outlet end 16 (rear) which leads into the aerodynamic diffuser 12. Preferably, the inlet end 15 of each aerodynamic channel 14 is arranged immediately behind a corresponding front wheel 3 and by the side, i.e. more internally, with respect to the corresponding front wheel 3 itself. Each aerodynamic channel 14 extends longitudinally from the front of the car 1 (i.e. from the front axle) to the rear of the car 1 (i.e. to the rear axle) and at the passenger compartment is arranged under a corresponding door 8. Furthermore, each aerodynamic channel 14 is arranged by the side, i.e. more internally, with respect to a corresponding rear wheel 5.

Each aerodynamic channel 14 has the shape of an upside-down "U" in its transverse section and is open underneath towards the road surface, and has in transverse section an area which progressively increases when longitudinally moving from the front to the rear. The conformation of the aerodynamic channels 14 is clearly illustrated in the section views shown in FIGS. 6-8 in which the upside-down "U" shape and the gradual increase of the area of the transverse section is apparent.

As shown in FIGS. 5-8, at the door 8, there is a central segment of each aerodynamic channel 14 is arranged by the side, i.e. more externally, with respect to the frame 2 (i.e. with respect to a longitudinal bar 17 of the frame 2 which is the outermost part of the frame 2 itself). Consequently, as shown in FIGS. 6-8, the central segment of each aerodynamic channel 14 is integral with the corresponding door 8 and thus moves together with the door 8 when the door 8 is opened. In other words, the part of the underbody 12 arranged at the door 8 (and provided with the central segment of the aerodynamic channel) is not fixed to the frame 2, but is fixed to the door 8 and thus moves together to the door 8 itself.

As shown in FIGS. 9-12, at the door 8, a central segment of each aerodynamic channel 14 is arranged underneath the frame 2, i.e. is obtained in the longitudinal bar 17 of the frame 2 which is the outermost part of the frame 2 itself. Consequently, as shown in FIGS. 10-12, a central segment of each aerodynamic channel 14 is integral to the frame 2, is arranged under the door 8, and is completely independent from the door 8 itself; each longitudinal bar 17 of the frame 2 is arranged under a door 8 and constitutes the door sill (which is fixed and part of the frame 2). In other words, the part of the underbody 12 arranged at the door 8 (and provided with the central segment of the aerodynamic channel) is fixed to the frame 2, and is independent from the door 8 and thus remains fixed and does not move together to the door 8 itself.

In the embodiment shown in the accompanying figures, the hinge 9 of each door 8 confers an opening/closing movement to the door 8 itself which develops along a mainly vertical plane; in a different embodiment (not shown) the rotation axis 10 of the hinge 9 of each door 8 is vertical and thus the hinge 9 of each door 8 confers an opening/closing movement to the door 8 itself which develops along a horizontal plane (i.e. in entirely conventional manner).

The car 1 described above has many advantages.

Firstly, the car 1 described above has an excellent aerodynamic efficiency, because the ratio between generated downforce and aerodynamic drag is very favorable (i.e. very high). The high aerodynamic efficiency is reached by virtue of the presence of aerodynamic channels 14 which start in very advanced position (i.e. near the front axle) and are thus capable of increasing the air flow which is conveyed to the aerodynamic diffuser 12 and of significantly reducing turbulences (i.e. interferences) of the air which is conveyed to the aerodynamic diffuser 12, thus allowing the aerodynamic diffuser 12 to work in very favorable conditions. Furthermore, the presence of aerodynamic channels 14 not only does not increase aerodynamic drag, but, on the contrary, contributes to reducing aerodynamic drag because aerodynamic channels 14 allow to reduce turbulences (i.e. interferences) of the air which is conveyed to the aerodynamic diffuser 12 significantly.

This by virtue of the fact that the central part of the aerodynamic channels 14 run on the sides of the frame 2 (and thus on the sides of the passenger compartment 7), the presence of the aerodynamic channels 14 is compatible with all the geometric constraints of the car 1.

Finally, by virtue of the fact that the aerodynamic channels 14 are carried by the doors 8, when the doors 8 are open the aerodynamic channels 14 are raised together with the doors 8 allowing passengers to get in and out of passenger compartment 7 of the car 1 easily; indeed, the passengers can rest their feet on the ground very close to the passenger compartment because they do not need to "climb over" the dimension of the aerodynamic channels 14.

The invention claimed is:
1. A car comprising:
   a frame, which supports a pair of front wheels and a pair of rear wheels;
   a passenger compartment, which is arranged between the front wheels and the rear wheels;
   at least one pair of doors, which are hinged to the frame and allow access into the passenger compartment; and
   an underbody, which delimits a lowest portion of the passenger compartment and the frame and faces a road surface, the underbody comprising an aerodynamic diffuser, which is arranged in a rear position and comprises a chute presenting a height with respect to the road surface that progressively increases when longitudinally moving from the front to the rear;
   wherein the underbody comprises a pair of aerodynamic channels formed in the underbody and arranged perpendicular to the road surface, each of which extends longitudinally, leads to the aerodynamic diffuser, is open on the lower side towards the road surface, and includes a transverse section presenting an area that progressively increases when longitudinally moving from the front to the rear;

wherein a portion of the underbody extends beneath each door and defines a segment of the corresponding aerodynamic channel which is arranged under a corresponding door.

2. A car according to claim 1, wherein an inlet end of each aerodynamic channel is arranged behind a corresponding front wheel.

3. A car according to claim 2, wherein an inlet end of each aerodynamic channel is arranged immediately behind a corresponding front wheel.

4. A car according to claim 3, wherein the inlet end of each aerodynamic channel is arranged immediately behind and next to, more on the inside with respect to, the corresponding front wheel.

5. A car according to claim 1, wherein each aerodynamic channel is arranged next to, more on the inside with respect to, a corresponding rear wheel.

6. A car according to claim 1, wherein the section of each aerodynamic channel that is arranged under a corresponding door is arranged next to, more on the outside with respect to, the frame.

7. A car according to claim 1, wherein the section of each aerodynamic channel that is arranged under a corresponding door is integral to the door and, therefore, moves together with the door when the door is opened.

8. A car according to claim 1, wherein each door comprises a corresponding door sill.

9. A car according to claim 8, wherein each door comprises the corresponding door sill with no fixed component is present under the door.

10. A car according to claim 1, wherein each door is hinged to the frame by a means for hinged movement, so as to rotate around a rotation axis, which causes the door to perform an opening/closing movement that develops along a mainly vertical plane.

11. A car according to claim 1, wherein each door is hinged to the frame by a hinge, so as to rotate around a rotation axis, which causes the door to perform an opening/closing movement that develops along a mainly vertical plane.

12. A car according to claim 1, wherein each aerodynamic channel longitudinally extends from a front of the car to a rear of the car.

13. A car according to claim 1, wherein each aerodynamic channel longitudinally extends from a front axle to a rear axle.

14. A car according to claim 1, wherein the aerodynamic diffuser begins close to a rear axle.

15. A car according to claim 1, wherein the transverse section of each aerodynamic channel presents the shape of an upside-down "U".

\* \* \* \* \*